Sept. 26, 1961     C. A. SALISBURY     3,001,546

CHECK VALVE

Filed Oct. 6, 1958

INVENTOR.
CLIFFORD A. SALISBURY
BY *Jerry J Dunlap*
ATTORNEY

United States Patent Office 3,001,546
Patented Sept. 26, 1961

3,001,546
CHECK VALVE
Clifford A. Salisbury, 1110 N. Main St.,
Tonkawa, Okla.
Filed Oct. 6, 1958, Ser. No. 765,566
2 Claims. (Cl. 137—541)

This invention relates generally to improvements in valves, and more particularly, but not by way of limitation, to an improved check valve construction.

In many hydraulic system, and particularly water systems, two difficult problems frequently occur simultaneously. Firstly, it may be desirable, or even imperative, to provide a check valve in a flow line of the system to prevent a retrograde flow of the hydraulic fluid being handled, without decreasing the normal capacity of the flow line. Secondly, the hydraulic fluid may contain foreign matter, such as sand, and the foreign matter cannot be allowed to interfere with a rapid and efficient closing of the check valve upon imposition of a pressure differential across the check valve in a direction to close the valve. The first of these problems (the use of a check valve without decreasing the normal capacity of a flow line) can be solved by the use of a check valve substantially larger in diameter than the flow line. However, the larger the valve being used, the greater the cost involved, and space limitations frequently prevent the use of a check valve wherein the body of the check valve is substantially larger in diameter than the remainder of th flow line. As a result, many different check valves have been designed which utilize a tubular valve body slightly larger in diameter than the flow line in which the valve is to be used, and a circular valve head mating with an annular seat in the valve body to provide substantial clearance around the head when the head is removed from the seat, as well as substantial clearance between the head and the seat when the valve is opened. However, previous valve designs of this type have utilized a valve stem extending axially from the valve head through a tubular or sleeve type guide held in the central portion of the valve body to maintain the valve head in alignment with the seat. Such valve stems frequently become lodged in guides by sand or other foreign matter packing into the guide around the outer periphery of the stem. Also, the sand or other foreign matter causes a substantial amount of wear of the guides a stems.

The present invention contemplates a novel check valve construction wherein the entire valve will have a diameter only slightly larger than the diameter of the flow line in which the valve is interposed; the valve will provide substantially no restriction to the normal flow of hydraulic fluid through the valve, and the operation of the valve will not be impaired by a normal amount of sand or other foreign matter in the hydraulic fluid being handled. More specifically, the present invention contemplates a check valve construction utilizing a tubular valve body, a guide sleeve or skirt of substantial size secured concentrically in the valve body, a spring-biased valve head cooperating with an annular seat in the valve body wherein the head has a diameter of a size to provide a substantially unrestricted flow of fluid when the head is removed from the seat, and a novel guiding construction extending from the valve head through the guide skirt to maintain the valve head in approximate alignment with its valve seat, and to support the valve head in the valve body, without the likelihood that the guiding construction will become impaired by foreign matter in the hydraulic fluid being handled. More specifically, the valve head guide construction contemplated by this invention comprises a plurality of legs extending from the valve head in circumferentially spaced relation and arranged in such a manner to slide along the inner periphery of the guide skirt to guide and support the valve head, without appreciably restricting the flow path through the skirt and the valve seat. Also, the valve head is urged toward the valve seat by means of a helical spring telescoped over the guide skirt and anchored to the free ends of the guide legs to permit use of the valve in substantially and desired direction, without foreign matter in the hydraulic fluid fouling the operation of the spring.

An important object of this invention is to provide a check valve which will have an outer diameter only slightly larger than the outer diameter of a hydraulic fluid flow line in which the valve is interposed, and yet the valve will not provide an appreciable restriction in the normal flow capacity of the flow line.

Another object of this invention is to provide a free flowing type of check valve having a minimum outer diameter and which will not be fouled by a normal amount of foreign matter in the hydraulic fluid being handled by the valve.

A further object of this invention is to provide a novel guiding and spring construction for the valve head of a check valve which will not be fouled by foreign matter entrained in hydraulic fluid handled by the valve.

A still further object of this invention is to provide a check valve which is simple in construction, may be economically manufactured, and will have a long service life.

Other objects and advantages of the invention will be evident from the following detailed description, when read in conjunction with the accompanying drawings which illustrate my invention.

Figure 1:
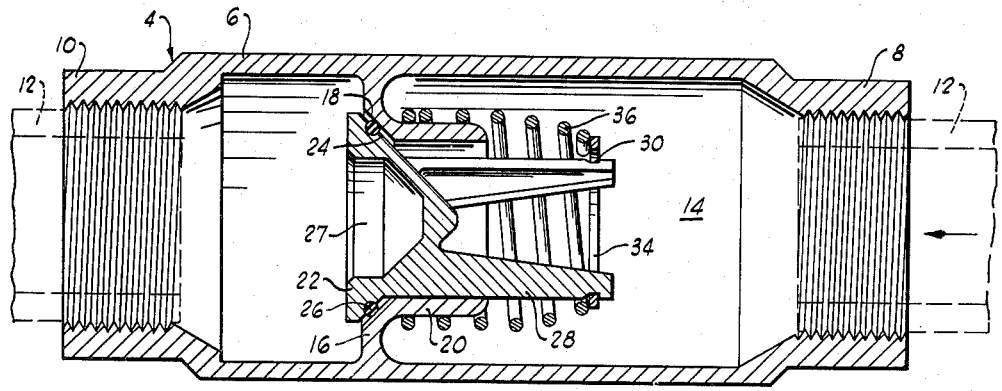
FIGURE 1 is a longitudinal sectional view through a check valve constructed in accordance with this invention, illustrating the valve in a closed position.

Referring to the drawings in detail, reference character 4 generally designates a check valve constructed in accordance with this invention which comprises a tubular body 6 having its inlet end 8 and its outlet end 10 threaded or otherwise adapted for connection with adjacent portions of a hydraulic flow line 12. The body 6 is slightly increased in diameter inwardly of the end portions 8 and 10 to provide a valve chamber 14 in the body 6 having a diameter slightly larger than the inner diameter of the flow line 12, for purposes which will be described.

An inwardly extending circumferential shoulder 16 is formed in the body 6 closer to the outlet end 10 of the valve than the inlet end 8 and having the inner portion 18 of one face thereof tapered in a converging manner toward the inlet end 8 to provide an annular tapered valve seat facing the outlet end 10 of the valve. Also, a circumferential flange 20 extends from the flange 16 in a direction toward the inlet end 8 of the valve to provide a skirt or sleeve forming a guide for the valve head 22, as will be described. It may also be noted that the inner diameter of the skirt 20 is substantially the same size as the inner diameter of the valve seat 18, and that the skirt 20 is supported concentrically in the chamber 14.

The valve head 22 is preferably conically-shaped to partially enter the valve seat 18 from the direction of the outlet end 10 of the valve and is provided with an annular tapered area 24 designed to mate with the tapered valve seat 18. I prefer to provide an O-ring type of seal 26 in a complementary groove in the portion 24 of the valve head 22 to engage the valve seat 18 and effectively seal the valve head to the valve seat for preventing a retrograde flow of hydraulic fluid through the valve. It is also desirable that the inner portion 27 of the valve head 22 be hollowed out to reduce the weight of the valve head 22.

Figure 3:
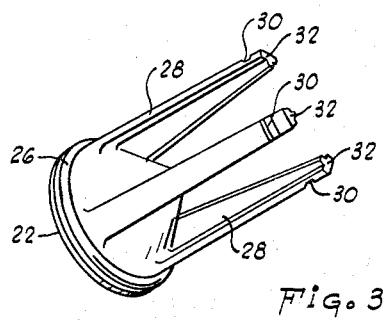
FIGURE 3 is a perspective view of the valve head and guide legs.

The valve head 22 is supported in the body 6 and guided in its reciprocating movement by circumferentially spaced guide legs 28 extending from the head 22 through and cooperating with the skirt 20. As most clearly shown in FIG. 3, I prefer to provide three of the guide legs 28 arranged in circumferentially spaced relation with equal spacing between the adjacent legs to provide adequate support for the valve head 22, regardless of the angle at which the valve head 22 is turned with respect to the seat 18. The outer peripheries or surfaces of the guide legs 28 are formed on the arc of a circle having a diameter slightly less than the inner diameter of the skirt 20, such that the guide legs 28 will loosely support the valve head 22 with respect to the seat 18. With this relationship of the sizes of the elements, the guide legs 28 will have no tendency to be frozen in the skirt 20 by temperature variations in the valve 4; the guide legs 28 will have a minimum tendency to be frozen in the skirt 20 by sand or other foreign matter packing between the outer surfaces of the legs and the inner surface of the sleeve 20, and friction between the legs 28 and the skirt 20 will be substantially eliminated to assure that the valve head 22 may be reciprocated in the valve body 6 under all operating conditions.

Figure 2:
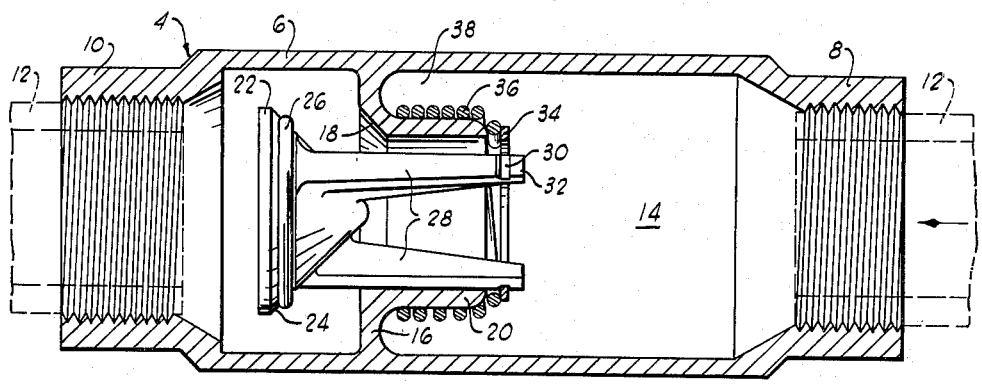
FIGURE 2 is a view similar to FIG. 1, except that the valve head and a portion of the guiding structure are shown in elevation, and the valve is shown open.

A transverse groove 30 is provided in the outer periphery of each guide leg 28 adjacent the free end 32 of the respective leg to receive a snap ring 34 as illustrated in FIGS. 1 and 2, such that the snap ring 34 extends transversely with respect to the center line of the valve seat 18 and skirt 20. It may also be noted that the guide legs 28 are substantially longer than the skirt 20 to extend beyond the skirt 20 toward the inlet 8 of the valve when the valve head 22 is seated on the seat 18 as shown in FIG. 1. A helical compression spring 36 is telescoped over the skirt 20 and the guide legs 28, and one end of the spring 36 is anchored against the snap ring 34. It is preferred that the helical spring 36 be somewhat conical in configuration to extend around the skirt 20 and into contact with the smaller diameter snap ring 34. The opposite end of the spring 36 is either anchored on the outer periphery of the skirt 20 or against the flange 16 to constantly react on the snap ring 34 and urge the valve head 22 to a closed position.

The valve 4 operates in the usual manner of a check valve to provide an opening of the valve when the pressure upstream of the valve is sufficient to overcome the force imposed on the valve head 22 by the spring 36, and to be closed by action of the spring 36 when the pressure upstream of the valve is decreased. As the valve head 22 is moved back and forth in its opening and closing movements, the guide legs 28 cooperate with the skirt 20 to maintain the valve head 22 substantially in alignment with the seat 18. It will be noted, however, that since the valve head 22 and the seat 18 are tapered to converge toward the inlet 8 of the valve, the valve head 22 will be self-centering and will effectively enter and close the valve seat 18 when the pressure upstream of the valve is decreased, even though the head 22 is not retained in precise alignment with the valve seat 18 as the valve head enters the valve seat.

It should also be noted that when the valve is open as illustrated in FIG. 2, the tapered configuration of the valve head 22 provides a smooth flow path for the hydraulic fluid progressing through the valve between the valve head and the valve seat 18, and that the clearance provided around the valve head 22 between the valve head and the seat 18, as well as between the valve head and the inner periphery of the valve body 6, is sufficient to provide no appreciable restriction against the normal flow of hydraulic fluid through the valve. The inner diameters of the seat 18 and the skirt 20 may be made of appreciable size. Furthermore, the spaced relation of the guide legs 28 provides substantial clearance through the skirt 20 for the passage of the hydraulic fluid. The spring 36 is substantially telescoped onto the skirt 20 when the valve is opened, and is out of the normal flow path of the hydraulic fluid passing through the valve to provide no interference for this flow. When the skirt 20 is formed integral with the flange 16, the annular-shaped space 38 around the skirt 20 will be filled with the fluid flowing through the valve 4, such that foreign matter in the fluid will have a minimum tendency to accumulate in this space and interfere with operation of the spring 36.

From the foregoing it will be apparent that the present invention provides a check valve having an outer diameter only slightly larger than the outer diameter of a flow line in which the valve is interposed and yet the check valve will provide no appreciable restriction against normal flow through the flow line. In other words, when the valve is open, fluid may flow through the valve substantially as freely as it flows through the flow line in which the valve is interposed. The novel guide and spring construction of the present valve will provide an effective closing of the valve and will not be impaired by a normal amount of foreign matter in the hydraulic fluid being handled by the valve. Also, the valve may be easily disassembled for repair or replacement of parts. It will be further apparent that the present valve is simple in construction, may be economically manufactured, and will have a long service life.

Changes may be made in the combination and arrangement of parts or elements as heretofore set forth in the specification and shown in the drawings, it being understood that changes may be made in the precise embodiment disclosed without departing from the spirit and scope of the invention as defined in the following claims.

I claim:

1. A check valve for preventing retrograde flow of a stream of liquid, comprising a body having a passageway therethrough for the liquid and an inlet end and an outlet end, a flange extending circumferentially around the inner periphery of the body and having the face thereof nearest the outlet end of the body tapered to form an annular valve seat in said passageway, a guide skirt extending from said flange toward the inlet end of the body, a movable valve head in the body having an annular-shaped tapered area for mating with the valve seat and preventing flow of the liquid through the valve seat toward the inlet end of the body, a plurality of guide legs extending from the valve head through the seat and the skirt in circumferentially spaced relation with the outer edges of said legs arranged on the arc of a circle having a diameter slightly less than the inner diameter of the skirt to loosely support the valve head in the body, said guide legs being longer than said skirt, a snap ring secured around said guide legs adjacent their free ends, and a helical spring telescoped over said skirt with one end thereof against said flange and its other end against said snap ring, said spring having a diameter substantially equivalent to the outside diameter of said skirt at its end adjacent said flange, and diminishing to a diameter substantially equal to the diameter of said circle determined by the outer edges of said legs at its other end.

2. A valve as defined in claim 1 wherein the valve head is conically shaped and hollow with the apex thereof being extended toward the inlet end of the body, and wherein said legs are secured to the sides of said valve head between said apex and said tapered area.

(References on following page)

References Cited in the file of this patent

UNITED STATES PATENTS

| | | |
|---|---|---|
| 141,309 | Barnes | July 29, 1873 |
| 287,007 | Cullingworth | Oct. 23, 1883 |
| 569,323 | Conrad | Oct. 13, 1896 |
| 666,245 | Ginaca | Jan. 15, 1901 |
| 1,026,472 | Smith | May 14, 1912 |
| 1,111,319 | Paulsmeier | Sept. 22, 1914 |
| 2,679,262 | Barnett | May 25, 1954 |
| 2,870,576 | Parker | Jan. 27, 1959 |

FOREIGN PATENTS

| | | |
|---|---|---|
| 1,035,787 | France | Apr. 22, 1953 |